W. J. JOHNSON.
SEED PLANTER.
APPLICATION FILED JAN. 2, 1914.

1,128,787.

Patented Feb. 16, 1915.
2 SHEETS—SHEET 1.

Witnesses
Stuart Hilder.
Frances M. Anderson.

William J. Johnson
By E. W. Anderson & Son
Attorney

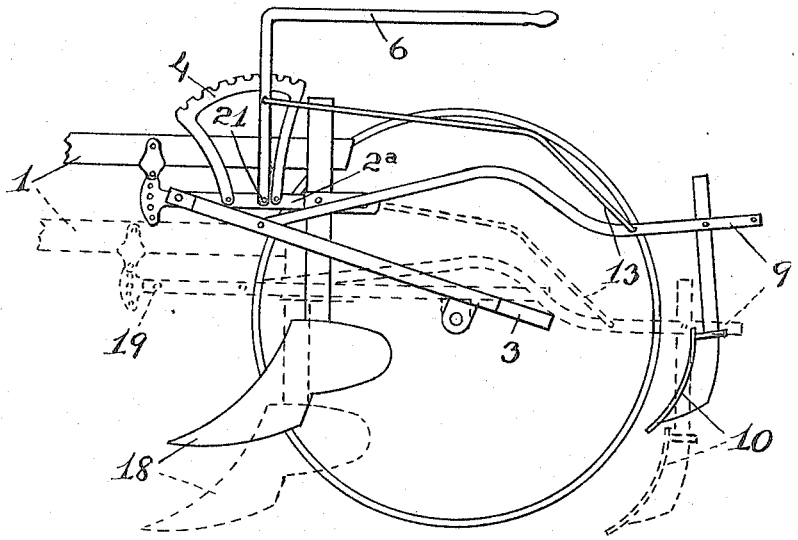
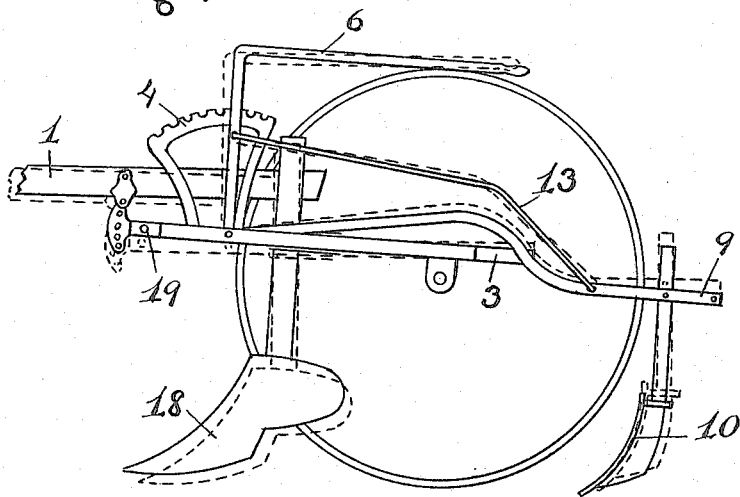

UNITED STATES PATENT OFFICE.

WILLIAM J. JOHNSON, OF MUNDAY, TEXAS.

SEED-PLANTER.

1,128,787.

Specification of Letters Patent. Patented Feb. 16, 1915.

Application filed January 2, 1914. Serial No. 809,992.

*To all whom it may concern:*

Be it known that I, WILLIAM J. JOHNSON, a citizen of the United States, resident of Munday, in the county of Knox and State of Texas, have made a certain new and useful Invention in Adjustable Covering Attachments for Seed-Planters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
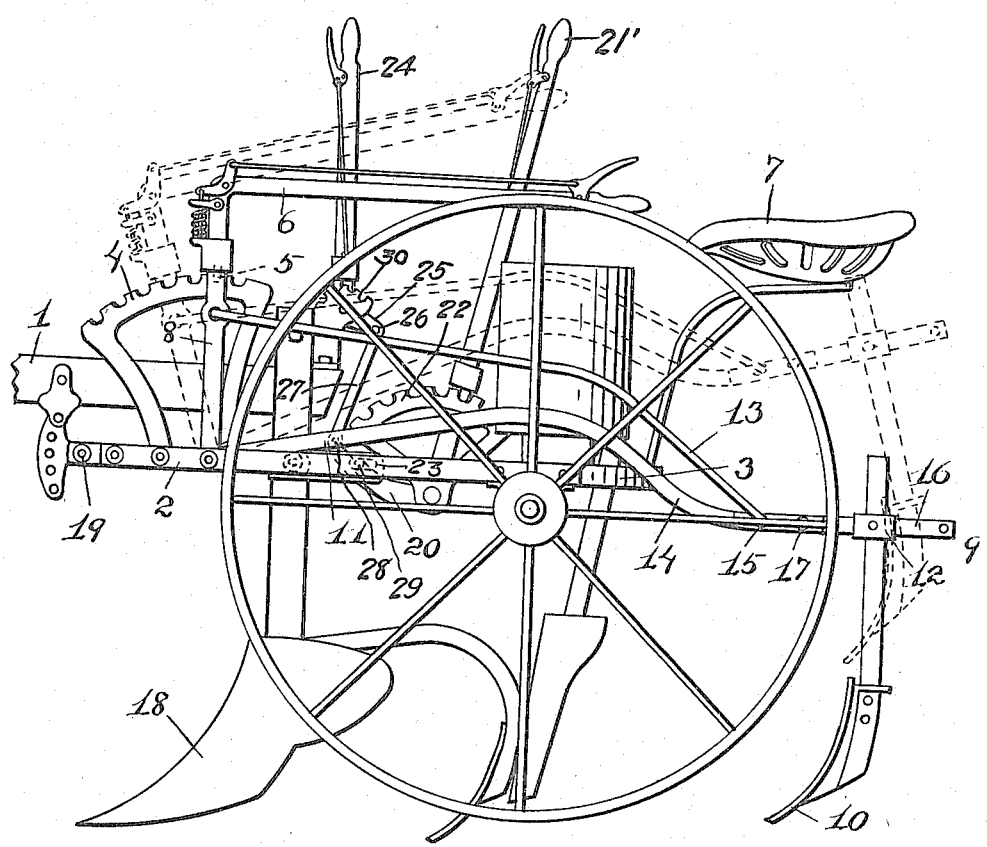
Figure 2:
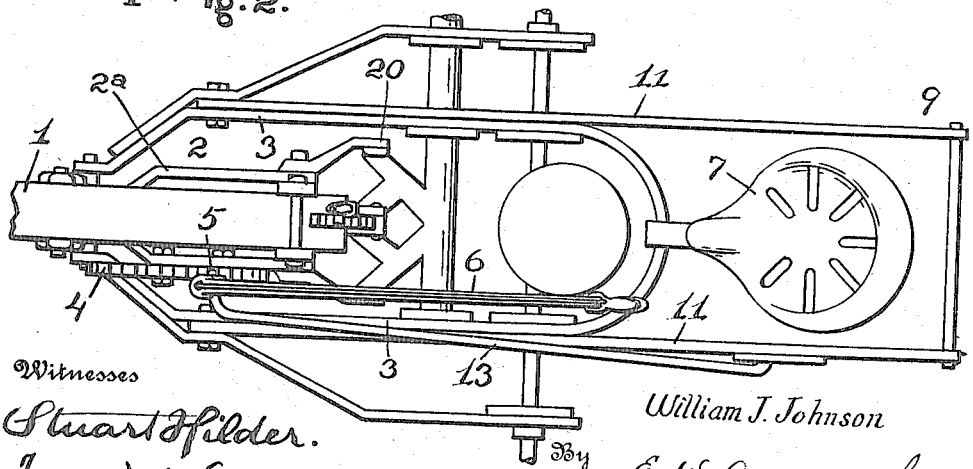

Figure 1 is a side view of the attachment, as applied, the raised portions of the coverer plows being shown in dotted lines. Fig. 2 is a plan view of the attachment as applied, parts being broken away. Fig. 3 is a diagrammatic side view of the attachment, as applied, illustrating the simultaneous vertical adjustment of the main and coverer plows. Fig. 4 is a similar view illustrating the simultaneous adjustment of the main and coverer plows to alter their pitch.

The object of the invention is to provide certain improvements upon a riding or wheel planting plow, which are designed to facilitate its use as a listing plow, and also to increase its usefulness as a planter.

The invention consists in the novel construction and combinations of parts, as hereinafter set forth.

The invention is designed mainly for use with plows wherein the seat is in rear of the axle and the seed box in front of the seat, and is shown as applied to the type of planter patented February 20, 1906, Number 812,925.

In the accompanying drawings, illustrating the invention, the numeral 2 indicates the main or draft frame of the planting plow, having the parallel side bars 3, preferably horizontally curved in rear in the ordinary way and being supported by the axle of the wheels.

Near the clevis, which is connected to the pole 1, bars 2ª of an auxiliary frame are provided with an upward projecting ratchet 4, having engagement with the pawl 5 of a right-angle lever 6, the long rear arm of which extends backward, substantially parallel with the draft frame, to within a convenient distance of the seat 7, which is supported on the framing in rear of the axle. The vertical arm 8 of the right-angle lever is pivoted to beam 2ª, between the arms of the ratchet, and it extends normally upward, substantially to a level with the seat. In the construction shown, the position of the seat is about as far in rear of the axle as the position of the ratchet is in front of it.

To the front of the draft frame, upon the side bars 3, is pivoted a long secondary frame 9, the rear parallel arms of which extend back of the axle and substantially below the seat. To the rear portions of the secondary frame are secured standards of the adjustable covering blades 10, these being connected to the rear lower and normally horizontal portions 16 of the arms by bracket fastenings 12, which provide for horizontal as well as vertical adjustment of the shanks of the covering blades.

To secure suitable rigidity, the secondary frame is usually made of ribbed iron, and its lateral arms 11 are provided with rearward and downward guiding bends or portions 14, in order to bring its rear portions 16 nearer to the ground than its front portions. In this way it is designed to provide for the use of short and rigid shanks for the covering blades, and to facilitate such adjustments as the operator may find appropriate in working the planter.

In one of the rear lower portions 16 of the secondary frame are made apertures or bearings 15 and 17, one some distance in rear of the other, for attaching the rear end of the long curved connecting rod 13, which passes above the bend of the secondary frame and is pivoted by its front end to the right-angle lever, about midway its upright branch. When the connecting rod is pivoted to the rear perforation or bearing 17, the secondary frame will be tilted up in rear at a high angle, and the covering blades will be lifted high above the ground, the adjustment of the right-angle lever for this position of the secondary frame being substantially horizontal and out of the way of the operator.

Because of the length of the secondary beam from its pivotal point in front of the axle to the covering attachments in rear thereof, its adjustments may be regulated by the right-angle lever for such small variations in the position of the covering blades as may be advisable, or to provide for lifting them to greater extent. By means, therefore, of the angle lever and ratchet, the secondary frame and the connecting rod, the covering blades may be raised and held high above the ground. And by means of this lever and the connecting rod, in substantially the same position, the covering blades can be adjusted to suit small variations of depth required in the planting, and held to the adjustment in such wise as to prevent casual rising or falling of the covering blades.

The plow 18 is supported from the auxiliary frame bars 2ª, which are pivoted to the side bars 3 at 19, and may be raised or lowered with bars 2ª substantially as stated in the patent referred to, by operation of a lever 21′, mounted upon the main frame and having pawl engagement with the rack 22, upon said frame to fix the lever in position as adjusted, said lever having an arm 20 engaging at its end with a slot 23 of the auxiliary frame. At the same time lever 6 (rigidly connected to the bars 2ª by pivot 21 and pawl 5, engaging rack 4) will move with the plow and with said bars, thereby, through connecting rod 13, providing for the raising or lowering of the covering blades 10 simultaneously with the main plow 18.

In the type of planter shown, the pitch and comparative depth of the main plow and covering blades is altered by tilting the main frame 2 upon the axle shaft, the relation of the side bars 3 with the bars 2ª being unchanged. This tilting is accomplished substantially as stated in the patent referred to, by operation of a lever 24, having an arm 25 connected at its end pivotally at 26 with the upper end of a rod 27, the lower end of said rod having pivotal connection 28 with an arm 29 of the lever 21′, the lever 24 being mounted upon the draft pole 1, a rack 30, also mounted upon said draft pole, being engaged by a pawl of the lever to fix the adjustment thereof. Thus the covering blades, supported from bars 3 by secondary frame 9 and from bars 2ª by connecting rod 13, will be moved rigidly with the frame 2, in the operation stated.

In the present case, an adjustment of the covering blades is provided for independently of the adjustment of the plow 18, in order to avoid the necessity of taking off the covering blades when listing land, and further in order to obtain different adjustments of the covering blades for depth, without disturbing the position of the plow 18; at the same time providing for the simultaneous adjustment of the covering blades and the plow 18 when desired.

What I claim is:

1. In a wheeled planting plow, an outer main frame, an inner auxiliary frame pivoted forwardly to said main frame and carrying a plow standard and a main plow, a secondary frame pivoted forwardly to said main frame and carrying rear coverer plows, lever-operated means mounted upon said main frame and engaging said auxiliary frame to effect simultaneous adjustment vertically of said auxiliary frame, the main plow, said secondary frame and the rear coverer plows, and lever-operated means for separate vertical adjustment of said secondary frame and the rear coverer plows without sacrifice of said simultaneous adjustment.

2. In a wheeled planting plow, an outer main frame, an inner auxiliary frame pivoted forwardly to said main frame and carrying a plow standard and a main plow, a secondary frame pivoted forwardly to said main frame and carrying rear coverer plows, lever-operated means mounted upon said main frame and engaging said auxiliary frame to effect simultaneous adjustment vertically of said auxiliary frame, the main plow, said secondary frame and the rear coverer plows, and lever-operated means for separate vertical adjustment of said secondary frame and the rear coverer plows without sacrifice of said simultaneous adjustment, comprising a rack rigidly secured to the forward part of said inner frame, a lever pivoted at its lower end to the forward part of the main frame and having a releasable pawl engagement with said rack, and a connecting rod between said lever and said secondary frame.

In testimony whereof I affix my signature, in presence of two witnesses.

WILLIAM J. JOHNSON.

Witnesses:
D. T. MAULDIN,
J. L. JOHNSON.

Copies of this patent may be obtained for five cents each, by addressing the "Commissioner of Patents, Washington, D. C."